United States Patent Office 3,476,272
Patented Nov. 4, 1969

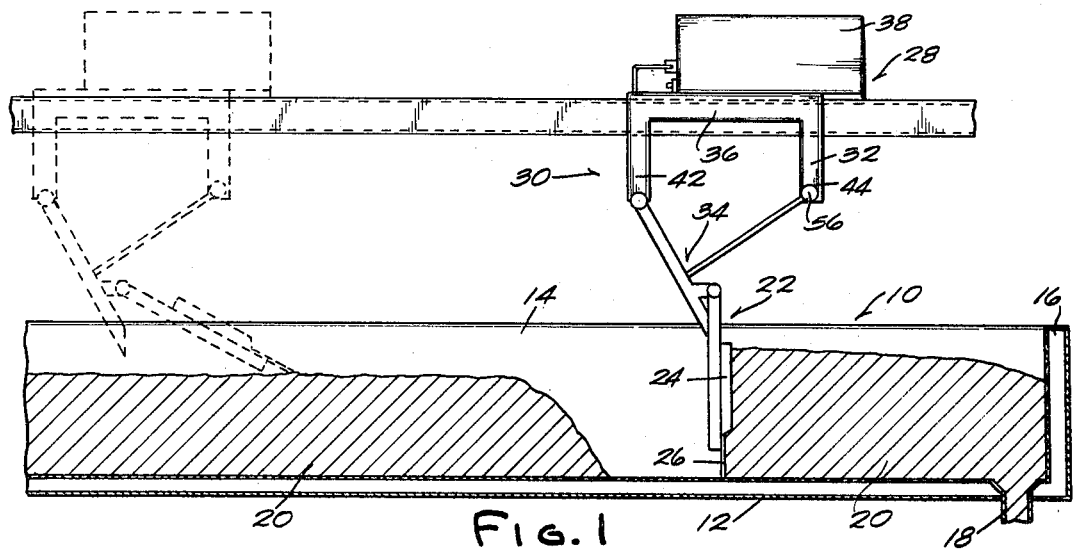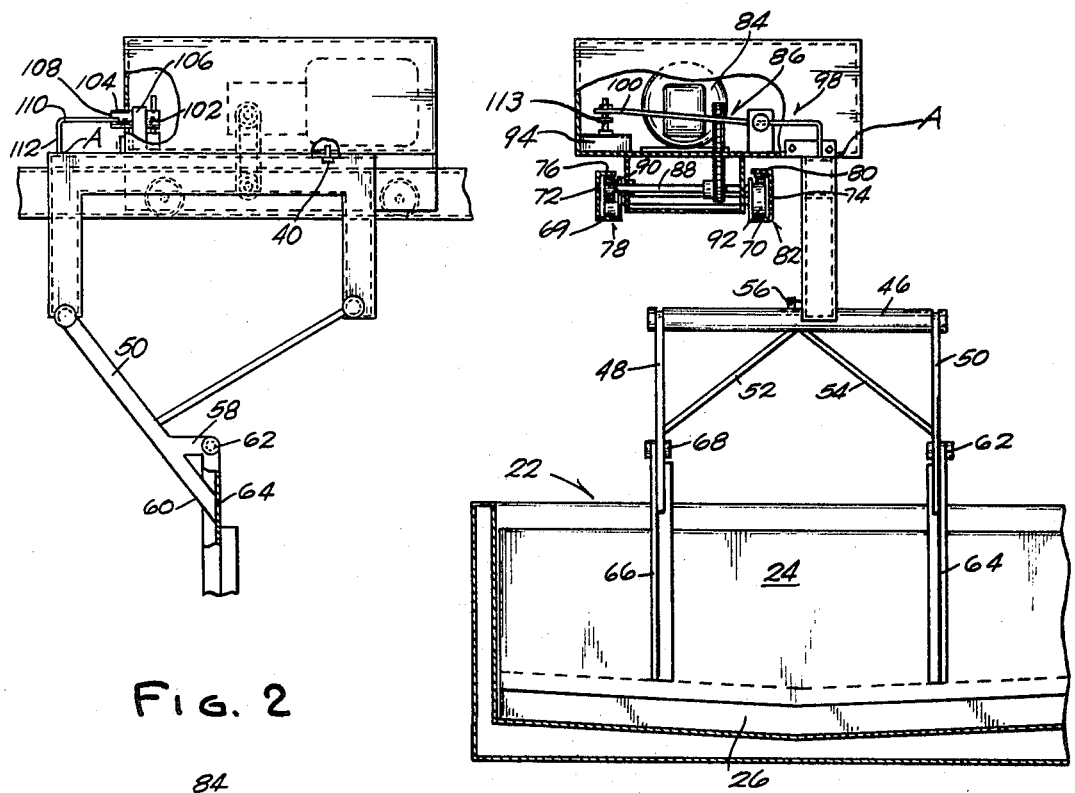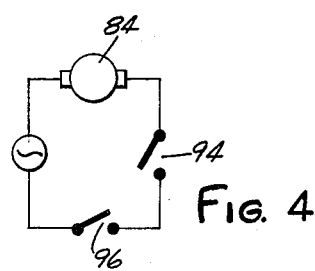

3,476,272
PRODUCT PUSHER ASSEMBLY FOR
PROCESSING VAT
Ruben W. Puta, Saint Nazianz, Wis., assignor to
Stoelting Brothers Company, Kiel, Wis., a corporation of Wisconsin
Filed Sept. 27, 1967, Ser. No. 670,953
Int. Cl. B65g 65/30, 25/08
U.S. Cl. 214—17
7 Claims

ABSTRACT OF THE DISCLOSURE

This disclosure relates to the arrangement of a pusher blade assembly in a processing vat. The blade is supported by a mounting assembly from a carriage for movement toward and away from the vat outlet. A rigid connection is provided between the pusher blade and the carriage as the blade is moved toward the outlet and the pressure of the accumulation of product medium in the vat between the blade and the outlet is transmitted to the blade mounting assembly and the carriage. This pressure produces deflection of the mounting assembly and the carriage. A safety control is connected in the circuit of the carriage drive and is responsive to the deflection such that the control is actuated and interrupts operation of the carriage drive in response to a predetermined amount of deflection indicative of a preselected amount of accumulation. The safety control is in series with an ON-OFF control switch so that as the accumulation of product medium recedes and the deflection of the mounting assembly and carriage relaxes, the safety control recloses and automatically re-establishes operation of the carriage drive.

BACKGROUND OF INVENTION

Field of invention

This invention relates to removal of a liquid product, such as creamed cottage cheese, from a processing vat and, more particularly, to the combination of such an arrangement with an automatic safety control which prevents excessive accumulation of product at the processing vat outlet which could result in damage to the product removal apparatus and/or detrimentally affect the product.

Description of prior art

This invention will be discussed in connection with a step in a cottage cheese-making operation, but it will be appreciated that the invention is not so limited but may be used in connection with any number of products having flow characteristics. Cottage cheese is processed in one or more processing vats and at the termination of a particular step in the cheese-making process the product is removed from the vat through a suitable outlet. The cottage cheese, being a liquid or a semi-liquid product, will flow in the vat to and through the outlet. In this regard, it has been known to provide the vat with a pitched bottom wall to enhanced product flow and, in other instances, the vat has been provided with a suitable mechanism for tipping the vat above the outlet to further enhance flow. As the product becomes less fluid, i.e. its viscosity increases, the removal of the product from the vat becomes more difficult. Delivery of the product to the outlet is as much a problem, if not a greater problem, than maintaining flow through the outlet. In some instances manual shoveling of the product to the outlet has been required to maintain continuous flow in the vat to the outlet.

A need has existed for an arrangement for automatically maintaining continuous flow of product to and through the outlet. Furthermore, the need has existed for such an automatic delivery device which is capable of preventing excessive accumulation at the outlet which might result in damage to the mechanical elements of the delivery mechanism as well as damage to the product itself; for example, in the case of cottage cheese an excessive squeezing force on the product should be avoided.

SUMMARY OF INVENTION

In accordance with this invention a blade mechanism is provided in a processing vat and is supported for movement toward the vat outlet by means of a suitable drive system. The drive system is controlled by an arrangement which is responsive to the accumulation of the product between the blade mechanism and the vat outlet. When the accumulation reaches a predetermined maximum permissible level, the control interrupts operation of the drive system bringing the mechanism to rest thereby terminating delivery of the product to the outlet to permit the accumulation of product to recede. In its more specific aspects, sensing of the amount of accumulation of product is achieved by providing a rigid mounting between the blade mechanism and the drive system. This rigid connection results in deflection of the blade mechanism mounting and in the drive system which deflection corresponds to the accumulation of product. This deflection is utilzed to actuate the control. The control is preferably an electrical switch in the drive motor circuit and is operative to automatically restart the drive system when the accumulation of product recedes to a permissible level.

DESCRIPTION OF DRAWINGS

FIG. 1 illustrates a portion of a processing vat and a blade assembly incorporating this invention;

FIG. 2 is an enlarged view of the carriage and mounting assembly for the pusher blade with portions of the carriage housing broken away to expose interior structure;

FIG. 3 is a rear elevation of the blade assembly and its mounting arrangement and carriage, again with portions of the carriage housing broken away and shown in section to expose interior structure of the control arrangement;

FIG. 4 is a simplified circuit diagram of the circuit for the carriage drive motor.

DESCRIPTION OF PREFERRED EMBODIMENT

With particular reference to the drawings, processing vat 10 includes bottom wall 12 and upstanding side walls extending from the bottom wall. The vat includes two longitudinally extending side walls and opposed end walls but for convenience only one side wall 14 and one end wall 16 have been illustrated. The vat walls are hollow as can be seen in FIGS. 1 and 3 to accommodate a suitable medium which controls the temperature of the product within the vat. This medium can be used to provide either heating or cooling of the product and its use is well known as is the means for circulating it and for that reason neither the medium nor the circulation system have been illustrated.

An outlet 18 is provided in the bottom vat wall adjacent end wall 16. Cottage cheese curd is shown generally at 20 in FIG. 1. After a particular processing step in the making of cottage cheese, for example the creaming step, the creamed curd is emptied from the vat through outlet 18. The creamed curd is somewhat liquid but does not have good flow characteristics and for this reason some means must be provided for insuring flow of the curd to the outlet. The end of the vat remote from the outlet can be raised or an operator can be positioned near the outlet to hand shovel the product to the outlet. Even with raising the vat some hand shoveling may be necessary and neither of these insures continuous delivery of curd to the outlet. For example, it is possible that a hollow crater may form directly above the outlet because, due to the poor flow characteristics of the curd, flow to the outlet may be slower than flow through it.

This invention solves the problem of adequate delivery of product to the outlet by providing positive movement of the product toward the outlet and by doing so in a relatively safe manner which avoids damage to the product moving mechanism and the product itself. More particularly, blade assembly 22 is positioned in the vat and includes rigid body 24 and scraper 26 attached to the body and extending to the bottom wall. Scraper 26 is shaped to conform to the configuration of the bottom wall, as seen in FIG. 3 the bottom wall is angled toward the center and the scraper has a similar configuration. The scraper is made of a suitable material which can engage the bottom wall and insure complete movement of the product while maintaining a minimum of frictional drag; for example, the scraper can be made of a resilient material which is compatible with the cottage cheese product or can be made of nylon.

Pusher blade assembly 22 is connected to carriage 28 by a mounting assembly 30, the mounting assembly including mounting bracket 32 and suspension rigging 34. Mounting bracket 32 is in the form of an inverted U-shaped structural member having its web 36 suitably connected to the underside of housing 38 of the carriage. For example, machines, screws or bolts 40 (see FIG. 2) can be used to establish this attachment. Depending legs 42 and 44 of the mounting bracket extend toward the vat and the suspension rigging is connected to the ends of these legs.

Suspension rigging 34 includes an elongated rod 46 fixed to mounting bracket leg 42 and projecting on opposite sides of that leg. Hanger arms 48 and 50 are connected one at each end of rod 46 and struts 52 and 54 extend from hanger arms 48 and 50 to support pin 56 connected to leg 44 of the mounting bracket. The arrangement of struts, hanger arms and the mounting bracket provide a rigid connection between the blade assembly and the carriage.

Each hanger arm includes a lateral projection 58 spaced inwardly of its free end 60, only the projection on hanger arm 50 has been illustrated in FIG. 2 it being appreciated that the construction of hanger arm 48 is identical. Projection 58 is provided with a suitable aperture and pin 62 provides a pivotal connection between the hanger arm and angle iron 64 attached to the rear side of blade body 24. A similar connection is made between hanger arm 48 and angle iron 66, also attached to the rear side of blade body 24, by means of pin 68. With this arrangement, blade assembly 22 is free to pivot in a counterclockwise direction (in FIG. 1) about the pins 62 and 68 but its movement in a clockwise direction is limited by the free end of each of the hanger arms 48 and 50.

Carriage 28 is mounted on spaced tracks 69 and 70. These tracks are elongated and are supported in a suitable conventional manner (not shown) to extend substantially the length of vat 10. Carriage 38 and tracks 69 and 70 are conventional as is the drive for the carriage so that only a brief, general description is believed to be necessary to an understanding of this invention. Tracks 69 and 70 are in the form of channel members each having a web 72 and 74 and spaced legs 76, 78, 80 and 82. Drive motor 84 is supported within carriage housing 38. Chain drive 86 connects the motor to shaft 88. Shaft 88 carries a knurled wheel which engages track leg 76 to provide the traction drive for the carriage. A similar knurled drive wheel can be arranged to engage track 70 if desired. The carriage is supported for movement along the tracks by four flanged wheels 92 and motor 84 is reversible so that the carriage can be propelled in two directions longitudinally of the vat. In other words, the carriage is movable toward and away from outlet 18 thereby correspondingly moving the blade assembly toward and away from the outlet. As blade assembly 22 is moved by carriage 38 away from outlet 18, it is free to pivot about pins 62 and 68 to ride over curd 20 as illustrated in dotted lines in FIG. 1. In this manner, the blade assembly can be carried to the opposite longitudinal end of the vat without interferring with the curd product. When the carriage drive motor is reversed, movement of the carriage toward outlet end 16 of the vat causes blade assembly 22 to knife into the curd. Continued movement of the blade assembly pushes the curd before it toward the outlet. The carriage drive speed can be adjusted in accordance with the ability of outlet 18 to carry away the curd. In practice, however, this balancing of delivery speed with the ability of the outlet to remove the curd may be difficult to maintain and an accumulation of curd at the outlet may result. With curd accumulating in front of the blade, continued movement of the blade assembly can result in accumulation of product to an extent which can produce damage to the blade assembly and/or its support and also to the product itself. More particularly, in the case of creamed cottage cheese any excessive squeezing of the product which might occur due to excessive accumulation in front of any blade assembly can detrimentally affect product quality. This invention solves these problems by providing a control which responds to the accumulation of product in front of the blade assembly and automatically interrupts the carriage drive bringing the blade assembly to rest when the accumulation reaches a predetermined maximum permissible level.

More particularly, switch 94 is connected in series with the activating coil of motor 84, which is an electrical motor the drive of which is reversible in a conventional manner, together with an ON-OFF switch 96. Switch 94 is a normally closed switch so that when ON-OFF switch 96 is closed motor 84 is energized. By providing an actuating mechanism which responds to the accumulation of curd between the blade assembly and the outlet (or the pressure build-up in front of blade assembly 22) to control switch 94, the switch can be made to open and interrupt the operative state of motor 84 when accumulation of curd in front of the blade assembly becomes excessive or exceeds a predetermined maximum permissible level. The illustrated preferred embodiment takes advantage of an inherent structural characteristic in the support and drive arrangement for the blade assembly to achieve actuation of switch 94 in response to accumulation of curd. More particularly, the free ends of hanger arms 48 and 50 limit movement of blade assembly 22 in a clockwise direction and maintain an upright pushing position of the blade assembly when moving toward the outlet. The mounting bracket 32 and rigging assembly 34 provide a rigid connection between the blade assembly and the carriage when the blade is in its pushing position. The pressure exerted on the blade assembly stresses the carriage, mounting bracket and the rigging assembly. This stress will result in deflection in the mounting arrangement and the carriage, which deflection is proportional to the acmumulation of curd in front of the blade assembly. As is evident from the drawings, the housing 38 is made up of a plurality of interconnected walls and mounting bracket 32 is made of hollow structural members. These elements are preferably made of stainless steel and, it will be noted, that as far as is practical the structural elements of the carriage, track and support arrangement are made of stainless steel for sanitary purposes.

As the accumulation of curd in front of blade 22 increases, corner A of the mounting bracket raises. Switch 94 is supported within carriage housing 38 and actuating assembly 98 extends between corner A of the mounting bracket and the switch to produce switch actuation. Structurally the actuating assembly includes actuator arm 100 which extends from switch 94 to end 102 of shaft 104. Shaft 104 is rotatably mounted in bracket 106 attached to the bottom wall of the carriage housing. The opposite shaft end 108 is connected to feeler arm 110 and free end 112 of the feeler arm is turned down and engages corner A. With reference to FIGS. 2 and 3, as corner A raises feeler arm 110 is pivoted counterclockwise rotating shaft 108 and pivoting actuator arm 100 toward switch 94. Adjustable screw 113 engages the actuator button of switch 94 so that this movement depresses the actuator button and opens switch 94. Screw 112 is adjustable to permit some variation in the point at which actuation occurs in accordance with the accumulation of product in front of blade assembly. More specifically, the blade can be moved in the curd to establish a permissible maximum curd level and the screw 113 can then be turned to a point which just actuates switch 94.

It will be noted that ON-OFF switch 96 and control switch 94 are in series and both switches must be in an operative state in order for the drive motor 84 to be energized. The ON-OFF switch once closed remains closed unless manually opened so that when switch 94 is opened due to deflection of corner A switch 96 remains closed. Therefore, as the product flows through outlet 18 allowing the amount of curd in front of blade assembly 22 to recede and thereby relieve the stress on the mounting arrangement for the blade assembly the deflection in the mounting assembly and the carriage will relax allowing the actuating assembly to return to its normal position and allowing switch 94 to reclose. Since switch 96 remains closed the carriage will automatically be reactivated and movement of the blade assembly toward outlet 18 will proceed. It will also be noted that as long as switch 94 remains open the carriage cannot be manually started by manipulation of switch 96.

With this arrangement, the cottage cheese curd is positively and continuously moved toward outlet 18 to maintain a continuous delivery of product to the outlet. If at any time the delivery exceeds the ability of outlet 18 to handle the curd, the resulting accumulation of curd before the blade assembly produces deflection of the carriage and mounting assembly and actuates switch 94 to automatically interrupt carriage and blade assembly movement. This then provides time for the removal of the curd through outlet 18 to catch up to the delivery of the curd. The arrangement will then automatically restart itself providing the ON-OFF switch remains closed, to continue delivery of the curd to the outlet as soon as the curd level reaches a permissible level and so long as a balance of curd delivery and removal is maintained. It is appreciated that where the flow characteristics of the curd are such it is possible that the draining of curd through outlet 18 will not alleviate the accumulation of curd before the blade assembly to thereby result in automatic restart of the drive system. In that instance it may be necessary to station an operator at the outlet to hand shovel curd toward the outlet but even in that instance the blade assembly is effective to maintain a continuous supply of product to the hand shoveling operator.

I claim:

1. Apparatus of the type described comprising, in combination,
    a vat,
    means defining an outlet in said vat,
    blade means,
    mounting means supporting said blade means in said vat for movement toward said outlet to urge product medium in said vat toward said outlet,
    drive means for moving said blade means in said vat,
    said mounting means having a substantially rigid connection with said blade means when said blade means is moving toward said outlet and being subject to deflection as a result of pressure on said blade means due to accumulation of product medium between said blade means and said outlet,
    and control means connected to and controlling the operative state of said drive means, said control means also connected to said mounting means and operative, in response to a predetermined deflection of said mounting means, to interrupt the operative state of said drive means.

2. Apparatus according to claim 1 wherein said control means brings said blade means to rest in response to said predetermined deflection and is further operative, in response to a preselected reduction from said predetermined deflection due to said accumulation receding, to automatically re-activate said drive means and continue blade means movement.

3. Apparatus of the type described comprising, in combination,
    a vat,
    means defining an outlet in said vat,
    blade means in said vat and movable toward said outlet to urge product medium in said vat toward said outlet,
    carriage means including drive means for moving said blade means in said vat,
    mounting means connected to said carriage means and to said blade means and supporting said blade means in said vat for said movement relative to said outlet,
    said mounting means establishing a substantially rigid connection beween said blade means and said carriage means when said blade means is moving toward said outlet and accumulation of product medium between said blade means and said outlet resulting in deflection of said mounting means,
    and control means connected to and controlling the operative state of said drive means, said control means including a control member operatively connected to said drive means and actuating means connected between said control member and said mounting means, said actuating means responding to said mounting means deflection and, in response to a predetermined deflection indicative of a preselected amount of said accumulation, actuating said control member to interrupt said drive means and bring said blade means to rest.

4. Apparatus according to claim 3
including an ON-OFF control connected to and controlling the operative state of said drive means,
    said control member and ON-OFF control connected to co-operate in activating said drive means so that activation of said drive means occurs only when both said control member and ON-OFF control are in an active state,
    operation of said control means and said ON-OFF control being independent of each other so that said ON-OFF control remains active when said control member is rendered inactive as a result of said deflection,
    and wherein said mounting means relaxes from said deflection and returns toward a normal state as said accumulation of product medium recedes with said actuating means and control member responding to movement of said mounting means toward said normal state to automatically re-activate said drive means.

5. Apparatus according to claim 3
including track means extending generally co-extensively with said vat and supporting said carriage means and said blade means for movement toward and away from said outlet,
    and wherein said mounting means includes pivot means defining a pivotal support for said blade means, said pivot means allowing free pivotal movement of said blade means toward said outlet and limiting pivotal movement of said blade means in an opposite direction due to pressure of said accumulation of product medium thereon, and said mounting means also includes a mounting bracket attached to said carriage means and rigid with said pivot means with said deflection occurring at said mounting bracket and carriage means.

6. Apparatus according to claim 5 wherein said drive means comprises an electric motor, said control member comprises normally closed electrical switch means in circuit with said electric motor,
said actuating means extends between said mounting bracket and said switch means and is operative to open said switch means in response to predetermined deflection of said mounting bracket,
and including an ON-OFF switch in series circuit with said normally open switch means and in circuit with said motor and operative independent of said switch means.

7. Apparatus according to claim 6 wherein
said vat is elongated including a bottom wall and upstanding side walls,
said outlet is adjacent one of the opposite longitudinal ends of said vat,
said blade means extends between said side walls and adjacent said bottom wall and is movable longitudinally in said vat toward and away from said outlet,
said mounting bracket comprises a generally channel shaped member inverted with its web connected to said carriage means and said blade means is supported from the legs of said channel shaped member by hanger means a first portion of which forms a part of the pivot for said blade means and a second portion of which is arranged in the path of pivotal movement of said blade means to limit movement of said blade means away from said outlet.

References Cited
UNITED STATES PATENTS

| | | | |
|---|---|---|---|
| 984,249 | 2/1911 | Weschler | 214—17 |
| 2,495,096 | 1/1950 | Grimaldi | 198—224 |
| 2,808,158 | 10/1957 | Gilleo | 214—82 |

ROBERT G. SHERIDAN, Primary Examiner

U.S. Cl. X.R.

198—224, 232